United States Patent
Wisniewski

[11] Patent Number: 5,921,520
[45] Date of Patent: Jul. 13, 1999

[54] BRACKET FOR MOUNTING A FUEL FILTER

[76] Inventor: David M. Wisniewski, 7351 Metz, Shelby Twp., Mich. 48316

[21] Appl. No.: 08/510,613

[22] Filed: Aug. 3, 1995

[51] Int. Cl.[6] .................................................. A47G 1/10
[52] U.S. Cl. ...................... 248/316.1; 248/74.1; 248/300
[58] Field of Search .............................. 248/316.1, 316.5, 248/316.7, 68.1, 69, 71, 74.2, 74.4, 74.1

[56] References Cited

U.S. PATENT DOCUMENTS

| | | | |
|---|---|---|---|
| 875,533 | 12/1907 | Lane | 248/71 |
| 1,919,767 | 7/1933 | Bohlman . | |
| 1,963,908 | 6/1934 | Manasek | 248/316.1 X |
| 2,423,627 | 7/1947 | Tinnerman | 248/74.3 X |
| 2,747,827 | 5/1956 | Georgiev | 248/316.1 |
| 3,047,648 | 7/1962 | Mowatt | 248/316.7 X |
| 3,140,071 | 7/1964 | Lorentzen | 248/316.7 X |
| 3,163,391 | 12/1964 | Adams . | |
| 3,216,685 | 11/1965 | Raymond . | |
| 3,227,406 | 1/1966 | Shelton et al. | 248/74.4 |
| 3,287,690 | 11/1966 | Book . | |
| 3,313,009 | 4/1967 | Beckerer . | |
| 3,343,684 | 9/1967 | Galier | 248/316.7 X |
| 4,650,144 | 3/1987 | Conrad | 248/304 X |
| 5,016,843 | 5/1991 | Ward | 248/74.2 X |
| 5,121,894 | 6/1992 | Twork, Sr. et al. . | |

*Primary Examiner*—Derek J. Berger
*Attorney, Agent, or Firm*—John R. Benefiel

[57] ABSTRACT

An improved bracket for quickly and effortlessly mounting a fuel filter to a vehicle includes a base and a pair of mounting bolts for mounting the base to a vehicle surface. A first arcuate shaped member and a second arcuate shaped member extend from the base in a like direction and in opposing fashion and create an open cross section of a greater dimension than a corresponding cross section of the fuel filter. The fuel filter is axially inserted between the arcuate arms and into the bracket and abuts against a pair of inwardly directed tabs at an opposite axial end of the bracket. Fastener receiving portions extend from the arcuate side members and include aligned apertures which receive a fastening bolt. The bolt is rotatably tightened to draw the receiving portions and associated arcuate side members toward each other and to compressingly bias the bracket around the fuel filter.

12 Claims, 1 Drawing Sheet

BRACKET FOR MOUNTING A FUEL FILTER

BACKGROUND OF THE INVENTION

1. Field of the Invention

The present invention relates generally to fuel filter brackets and, more specifically, to an improved fuel filter bracket for quickly and effortlessly mounting a fuel filter to the fuel system of a vehicle.

2. Description of the Prior Art

Various types of bracketry are known in the art for securing a fuel filter to a vehicle fuel line interposed between its fuel tank and fuel intake. The fuel filter conventionally comprises a body which surrounds a filter element and which includes inlet and outlet lines which attach to the fuel line and which transport the fuel through the filtering element within the filter and then on to the fuel intake.

U.S. Pat. No. 5,121,894, issued to Twork, Sr. et al., discloses a fuel filter bracket for mounting a fuel filter to a vehicle without the need for tools or special equipment. The fuel filter bracket includes a base and a pair of arcuate side walls extending from the base which are spaced apart at their distal ends to create an opening. Each of the distal ends of the arcuate side walls includes an outwardly flared flange and the flanges, upon coming into abutting contact with the filter body, are forcibly spread outwardly to permit insertion of the cylindrically shaped filter. The arcuate side walls of the bracket are dimensioned in their unflexed position to be of a diameter somewhat smaller than that of the cylindrical fuel filter and are thus caused to bias inwardly against the sides of the filter in response to their initial outward deflection to hold the inserted filter in place.

The shortcoming of the Twork, Sr. et al. bracket is that a considerable amount of force is required on the part of the installer in order to spread apart the flanges to install the filter within the bracket. In an environment such as an auto assembly plant it is often necessary for an assembly worker to install hundreds of filters in succession. Considering that the required amount of force necessary each time a filter is installed does not change, it can become progressively more difficult for the worker to successively install the filters and, over time, will likely result in lower productivity and the possibility of injury to the worker's wrists and hands.

Also, while the disclosure of Twork states that the arcuate members are not deflected beyond their yield points as a result of the filter insertion, it is a known scientific fact that metal of any composition will begin to creep over time if it is held under stress. In a situation such as in Twork where the biasing forces of the outwardly deflected arcuate walls are the only holding forces generated by the bracket, and the bracket is necessary for holding the fuel filter in place over extended periods of time, it is very possible that the holding forces of the side walls against the walls of filter will weaken over time.

SUMMARY OF THE PRESENT INVENTION

The present invention discloses an improved bracket for quickly and effortlessly mounting a fuel filter of a vehicle fuel system. The bracket includes a base and a pair of mounting screws extending from the base which secure the bracket to a mounting surface of the vehicle. A first arcuate shaped member extends from along one side of the base and a second arcuate shaped member extends from along the other side of the base. The arcuate shaped members extend in a like direction and in opposing fashion so as to define therebetween an opening of satisfactory dimension for receiving the fuel filter in an axially inserted direction.

First and second fastener receiving portions extend from respective free edges of the arcuate shaped members and are aligned so that apertures formed in the receiving portions are positioned to receive an elongated fastener. A fastener nut engages a free end of the fastener and tightening of the fastener causes the arcuate shaped members to be drawn towards each other and to compress the fuel filter therebetween.

A pair of stop tabs extend inwardly from an axial end of the arcuate shaped members opposite the end through which the fuel filter is inserted. The inserted end of the fuel filter abuts against the stop tabs in order to locate the filter in the desired position relative to the bracket for being engaged by the arcuate members.

BRIEF DESCRIPTION OF THE DRAWING

Reference will now be made to the attached drawing, when read in conjunction with the following specification, wherein like reference numerals refer to like parts throughout the several views, and in which.

DESCRIPTION OF THE PREFERRED EMBODIMENT

Figure 1:
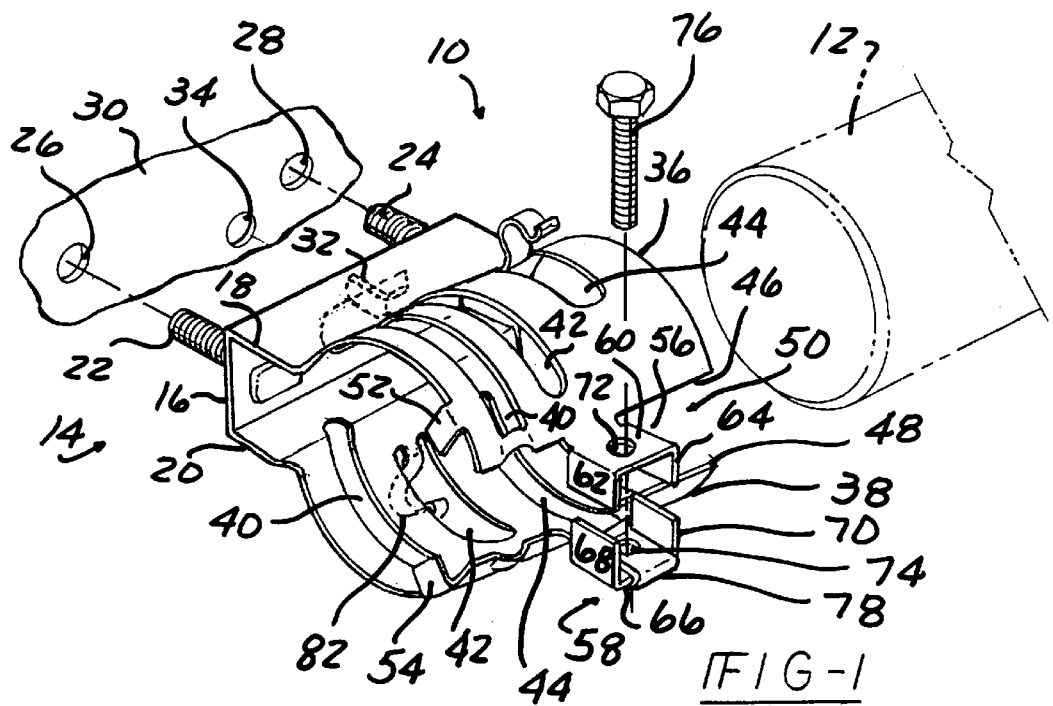
FIG. 1 is a perspective view of the improved fuel filter bracket according to the present invention.
Figure 2:
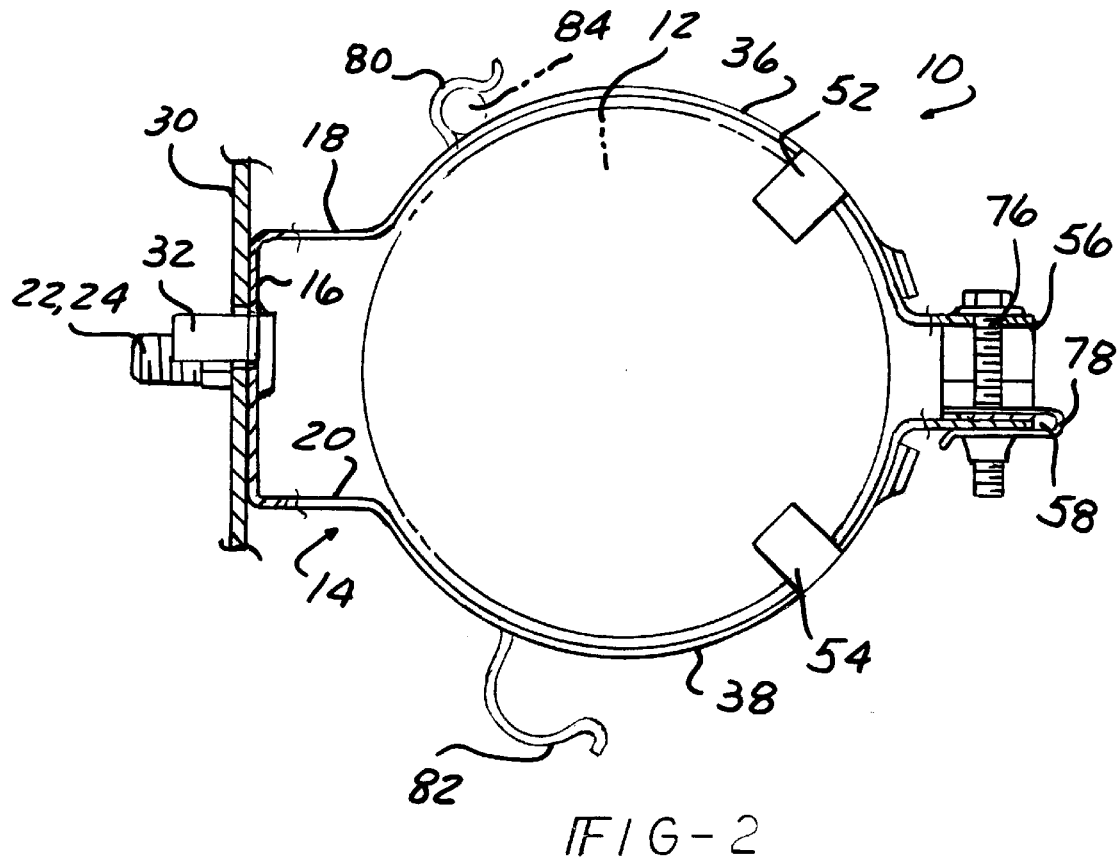
FIG. 2 is a two-dimensional end view of the improved fuel filter bracket shown in FIG. 1 and further showing the fuel filter in an inserted position.

Referring now to FIGS. 1 and 2 of the drawing, an improved fuel filter bracket 10 according to the present invention is shown which is capable of quickly and effortlessly mounting a fuel filter 12 of a conventional vehicle fuel system. As previously described, the fuel filter 12 is constructed of a conventional cylindrically shaped outer shell body and contains a filtering element (not shown) for filtering and purifying the vehicles fuel supply. Input and output ports extend from the shell body (also not shown) and receive appropriate fittings to transport fuel through the filtering element and then on to the vehicles fuel intake.

The bracket 10 is constructed of a base 14 having a bottom surface 16, a first substantially perpendicularly shaped side surface 18 and a second substantially perpendicularly shaped side surface 20. The bottom surface 16 and side surfaces 18 and 20 form a substantially U-shape in cross section and are of a width and length such that they are substantially rectangular shaped members. A pair of threaded mounting bolts 22 and 24 are secured at their heads to the bottom surface 16 of the base and extend in a direction opposite to the first and second side surfaces. The mounting bolts 22 and 24 engage apertures 26 and 28 formed in a mounting surface 30 of the vehicle which is preferably located in an area proximate to the vehicles fuel system. A pair of fasteners such as nuts (not shown) engage the ends of the bolts projecting beyond the mounting surface to secure the bracket 10 in place. A locating finger 32 extends from the bottom 16 of the base parallel to the bolts 22 and 24 and engages a like aperture 34 formed in the wall 30. The purpose of the locating finger 32 is to ensure that the bracket 10 is correctly mounted relative to the vehicle compartment.

A first arcuate shaped member 36 extends from the first side surface 18 and a second arcuate shaped member 38 extends from the second side surface 20 of the base 14. The arcuate shaped members 36 and 38 form a generally bowed shape as evident from FIGS. 1 and 2 and may extend along less than the total length of the bottom and side surfaces of the base but are preferably the same length as is shown in FIG. 1. A series of pairs of slotted recesses 40, 42 and 44 are formed along the width of the arcuate shaped members and contribute to the deformability and resiliency of the members while providing appropriate seating of the fuel filter configuration within the bracket.

The arcuate shaped members 36 and 38 extend in a like direction and in opposing fashion so as to define therebetween an opening of a larger cross sectional dimension than that of the corresponding diameter of the fuel filter 12. The first arcuate shaped member 36 terminates in a free edge 46 and the second arcuate shaped member 38 terminates in a free edge 48. A length 50 is established between the free edges 46 and 48 of the arcuate members and represents the distance which the arcuate members are spaced apart from each other in an undeflected position.

Referring again to FIG. 1, the fuel filter 12 is shown in an axial and pre-inserted position relative to the cross sectional opening between the arcuate members 36 and 38. As was previously described, the cross sectional opening is sufficient in size to permit the filter to be slidably inserted into the bracket without the necessity of outwardly deflecting the arcuate members, with the result being the filter positioned in a manner shown in FIG. 2. A pair of stop tabs 52 and 54 extend inwardly from an axial end of the arcuate members 36 and 38 opposite the end through which the fuel filter is inserted. The corresponding bottom face of the fuel filter 12 abuts against the stop tabs as shown in FIG. 2 to locate the filter at its desired position for engagement by the arcuate members, as will be subsequently described.

Referring again to FIGS. 1 and 2, a first fastener receiving portion 56 extends outwardly from along the free edge 46 of the first arcuate member 36 and a second fastener receiving portion 58 extends outwardly from along the free edge 48 of the second arcuate member 38. The first and second fastener receiving portions 56 and 58 are located in an inwardly spaced and substantially parallel manner relative to the side surfaces 18 and 20 of the base and are aligned substantially centrally along the length of the arcuate shaped members.

The first fastener receiving portion 56 includes a flat polygonal central portion 60 and a pair of angled side portions 62 and 64 extending from opposite edges of the central portion 60. Likewise, the second fastener receiving portion 58 includes a flat polygonal central portion 66 and a pair of angled side portions 68 and 70 extending from opposite edges of the central portion 66. An aperture 72 is formed through the central portion 60 of the first receiving portion 56 and aligns with an identical aperture 74 formed through the central portion 66 of the second receiving portion 58.

Upon satisfactory positioning of the fuel filter axially within the bracket, a threaded fastening bolt 76 is downwardly inserted through the first and second apertures 72 and 74 of the receiving portions 56 and 58 to begin the process of drawing the arcuate members in a direction towards each other. While the elements of the fuel filter bracket, including the base, the arcuate shaped members and the fastener receiving portions can be constructed of any material exhibiting the necessary properties of deformability and resiliency, they are preferably constructed of an SAE 1050 annealed spring steel which is austemper heat treated to provide the necessary characteristics to the bracket.

In one embodiment, a conventionally threaded nut, not shown, may be attached to the edge of the bolt shaft protruding from beyond the aperture 74 of the second receiving portion 58. Preferably however, the present invention teaches a U-nut clip 78 which secures over the central portion 66 of the second receiving portion and which includes an internally threaded aperture which aligns with the second aperture 74. Upon contact of the shaft of the bolt 76 with the U-nut 78, the bolt is rotatably driven relative to the apertures and the nut in an inserting direction, preferably by a conventional power wrench with a ratchet bit (not shown) corresponding to the diameter of the bolt head. Continued rotation of the bolt through the apertures causes the angled side portions 62 and 64 of the first receiving portion to draw towards the angled side portions 68 and 70 of the second receiving portion. The first pair of side portions 62 and 64 are spaced so that they will overlappingly engage the second pair of side portions 68 and 70 (see FIG. 2) upon complete insertion of the bolt so that the arcuate members are drawn toward one another and biasingly compress against the sides of the axially inserted fuel filter to hold the filter in place.

In this fashion, the installer of the bracket (such as an auto line assembly worker) may successively install as many of the brackets as is necessary using a suitable power tool wrench and without expending any significant amount of energy. The power tool provides all of the necessary compressive forces needed to draw the arcuate members together against the sides of the inserted fuel filter and does away with the necessity of the installer having to forcibly outwardly deflect the sides in order to install the filter from the side. The compressive force of the arcuate members against the fuel filter which is generated by the inserted bolt is furthermore retained over the life of the fuel filter and the bracket is not subject to stress relieving creep which is often associated with other flex members which do not utilize permanent fasteners.

Referring again to FIGS. 1 and 2, angled clip portions 80 and 82 are located and extend outwardly respectively from the arcuate members 36 and 38. The clips 80 are attached along edges of the slotted recesses 44 and the clips 82 are attached along edges of the slotted recesses 42 in the arcuate members. A series of fluid fittings of the fuel filter (see fitting 84 in FIG. 2 securing to clip 80) are secured to the clips and transfer the vehicles fluid to and from the filter prior to transference to the fuel intake.

The present invention therefore describes an improved bracket capable of quickly and effortlessly mounting a conventional fuel filter in an environment such as an auto assembly plant. Additional embodiments will become apparent to those skilled in the art to which it pertains without deviating from the scope of the appended claims.

I claim:

1. An improved bracket for quickly and effortlessly mounting a fuel filter of a vehicle fuel system, said bracket comprising:

a base and mounting means extending from said base for securing said base to the vehicle;

a first arcuate shaped member extending from along one side of said base and a second arcuate shaped member extending from along the other side of said base, said first and said second arcuate shaped members extending in a like direction and in opposing fashion and defining therebetween an opening of satisfactory dimension for receiving the fuel filter in an axially inserted direction;

a pair of inwardly directed stop tabs extending from a selected axial end of each of said first and second arcuate shaped members opposite the axially inserting end of the fuel filter, said stop tabs providing an abutting stop to the fuel filter subsequent to initial axial insertion and prior to final installation of the filter; and a first fastener receiving portion extending from a free edge of said first arcuate shaped member and a second fastener receiving portion extending from a free edge of said second arcuate shaped member, said first fastener receiving portion aligning with said second fastener receiving portion and each further having an aperture through which is inserted a fastener of a fastener means;

whereby, upon tightening of said fastener means, said first arcuate shaped member and said second arcuate shaped member are drawn in a direction towards each other to compress the fuel filter therebetween at the location the fuel filter is held in abutting contact by said inwardly directed stop tabs.

2. The improved fuel filter bracket as described in claim 1, each of said first and second fastener receiving portions further comprising a polygonal shaped central portion and a pair of angled side portions extending from said polygonal shaped central portion, a first pair of said angled side portions being spaced at a greater width than a second pair of said angled side portions so that said first pair of angled side portions overlappingly engages said second pair of angled side portions as said arcuate shaped members are drawn towards one another.

3. The improved fuel filter bracket as described in claim 2, said fastener comprises a threaded bolt and said fastener means further comprises a U-nut mounted to said central portion of said second fastener receiving portion for rotatably receiving said bolt.

4. The improved fuel filter bracket as described in claim 1, the fuel filter further including inlet and outlet ports and a plurality of fittings extending to and from the ports, said bracket further comprising a plurality of angled clip portions attached to said arcuate shaped members for retaining the fittings.

5. The improved fuel filter bracket as described in claim 1, further comprising pairs of recessed slots formed in said first and second arcuate shaped members, said pairs of slots adding resiliency and deformability to said arcuate shaped members.

6. The improved fuel filter bracket as described in claim 1, said base further comprising a bottom surface, a first side surface extending along one edge of the bottom surface and a second side surface extending along the other edge of the bottom surface.

7. The improved fuel filter bracket as described in claim 6, further comprising a pair of mounting bolts extending from said bottom surface for mounting said bracket to the vehicle.

8. The improved fuel filter bracket as described in claim 7, further comprising a locating finger extending from said bottom surface in parallel fashion to said mounting bolts, said locating finger ensuring proper orientation of the bracket.

9. The improved fuel filter bracket as described in claim 1, said arcuate shaped members forming a substantially cylindrical shape in cross section.

10. The improved fuel filter bracket as described in claim 1, said arcuate shaped members being resilient and deformable and said bracket being constructed of an annealed spring steel.

11. An improved bracket for quickly and effortlessly mounting a fuel filter of a vehicle fuel system, the fuel filter having a generally cylindrical shape with an inlet port located at a first end, an outlet port located at a second end and a plurality of fittings extending to and from the ports, said bracket comprising:

a base and mounting means extending from said base for securing said base to the vehicle;

a first arcuate shaped member extending from along one side of said base and a second arcuate shaped member extending from along the other side of said base, said first and said second arcuate shaped members extending in a like direction and in opposing fashion and defining therebetween an opening of satisfactory dimension for receiving the fuel filter in an axially inserted direction;

means for forming a plurality of recessed slotted portions in said first and second arcuate shaped members at spaced apart intervals, a plurality of angled clip portions extending from selected ends of said slotted portions in substantially arcuate fashion for receiving and fixedly securing selected fittings of the fuel filter; and a first fastener receiving portion extending from a free edge of said first arcuate shaped member and a second fastener receiving portion extending from a free edge of said second arcuate shaped member, said first fastener receiving portion aligning with said second fastener receiving portion and each further having an aperture through which is inserted a fastener of a fastener means;

whereby, upon tightening of said fastener means, said first arcuate shaped member and said second arcuate shaped member are drawn in a direction towards each other to compress the fuel filter therebetween.

12. A combination improved filter bracket and fuel filter for use with a vehicle fuel system, said combination comprising:

said fuel filter including a generally cylindrical shape with an inlet port located at a first end, an outlet portion located at a second end and a plurality of fittings extending to and from said ports;

said filter bracket including a base and mounting means extending from said base for securing said base to the vehicle;

said filter bracket further including a first arcuate shaped member extending from along one side of said base and a second arcuate shaped member extending from along the other side of said base, said first and said second arcuate shaped members extending in a like direction and in opposing fashion and defining therebetween an opening of satisfactory dimension such that said fuel filter is inserted in an axially inserted direction between said first and second arcuate shaped members; and a first fastener receiving portion extending from a free edge of said first arcuate shaped member and a second fastener receiving portion extending from a free edge of said second arcuate shape member, said first fastener receiving portion aligning with said second fastener receiving portion and each further having an aperture through which is inserted a fastener of a fastener means;

whereby, upon tightening of said fastener means, said first arcuate shaped member and said second arcuate shaped member are drawn in a direction towards each other to compress said fuel filter therebetween.

* * * * *